US00RE36697E

United States Patent [19]

Tsukamoto

[11] E Patent Number: Re. 36,697

[45] Reissued Date of Patent: May 16, 2000

[54] DOCUMENT FEEDER WHICH DETERMINES A DOCUMENT PATH USING A DETERMINED PAGE LENGTH

[75] Inventor: Youichi Tsukamoto, Misato, Japan

[73] Assignee: Ricoh Company, Ltd., Tokyo, Japan

[21] Appl. No.: 08/901,797

[22] Filed: Jul. 28, 1997

Related U.S. Patent Documents

Reissue of:

[64] Patent No.: 5,563,699
Issued: Oct. 8, 1996
Appl. No.: 08/355,832
Filed: Dec. 14, 1994

[30] Foreign Application Priority Data

Dec. 14, 1993 [JP] Japan ..... 5-312928

[51] Int. Cl.[7] ..... G03G 15/00

[52] U.S. Cl. ..... 399/45; 271/3.17; 399/370

[58] Field of Search ..... 399/45, 367, 370, 399/373, 376; 271/3.01, 3.14, 3.15, 3.17, 3.19

[56] References Cited

U.S. PATENT DOCUMENTS

| | | | |
|---|---|---|---|
| 4,713,674 | 12/1987 | Giezeman et al. | 399/390 |
| 5,031,003 | 7/1991 | Hamano | 399/367 |
| 5,132,741 | 7/1992 | Kitajima et al. | 399/370 |
| 5,280,330 | 1/1994 | Baba | 399/370 |

FOREIGN PATENT DOCUMENTS

| | | |
|---|---|---|
| 1597724 | 10/1975 | Germany . |
| 3630384 | 3/1987 | Germany . |
| 3827604 | 2/1990 | Germany . |

*Primary Examiner*—William J. Royer
*Attorney, Agent, or Firm*—Oblon, Spivak, McClelland, Maier & Neustadt, P.C.

[57] ABSTRACT

A document feeder for broad-width originals having a document path in which a moving document is scanned by a stationary scanner. The document feeder is typically mounted to a copier. The document path is either a recycling path or a reciprocating path; the recycling path having a closed loop path and the reciprocating path having an open loop path. A selector is mounted in the document path and selects one of the recycling path and the reciprocating path. A sensor is mounted in the document path for detecting a length of the document. When the length of the document detected by the sensor is not longer than a predetermined length, the recycling path is selected by the selector. When the length of the document detected by the sensor is longer than the predetermined length, the reciprocating path is selected by the selector.

6 Claims, 7 Drawing Sheets

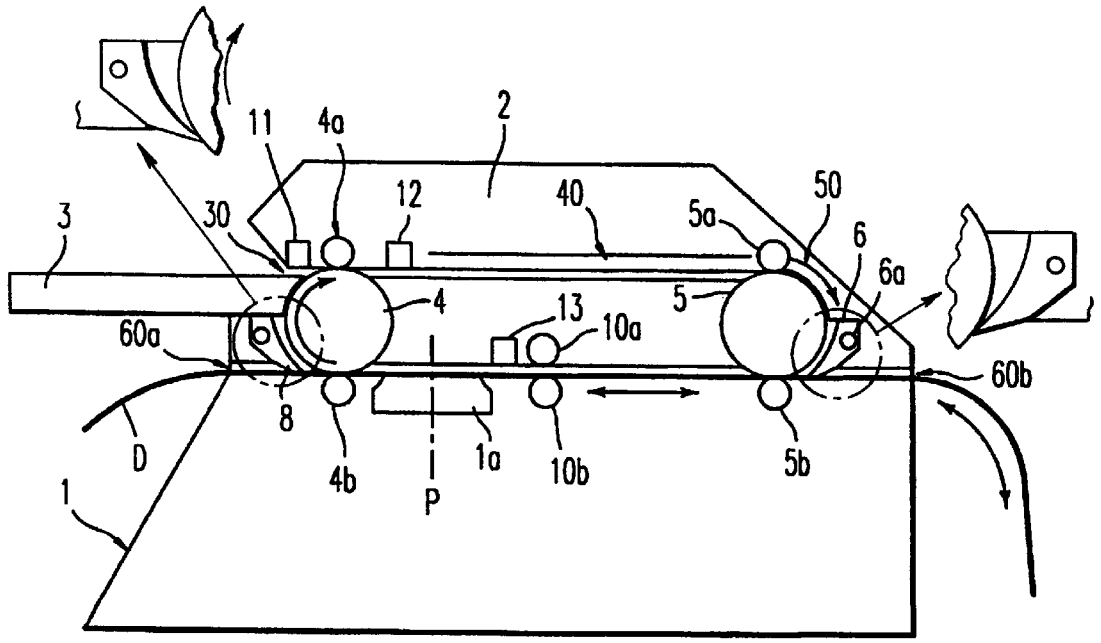
FIG. 2
(AMENDED)

DOCUMENT FEEDER WHICH DETERMINES A DOCUMENT PATH USING A DETERMINED PAGE LENGTH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a copier or similar equipment with a document feeder, and more particularly relates to an industrial type copier for broad-width originals.

2. Discussion of the Background

Copiers are divided into two types. One type is a copier in which a stationary document is scanned by a moving scanner. The other type is a copier in which a moving document is scanned by a stationary scanner. The industrial type copier for broad-width originals mostly employs the latter type of mechanism.

When a plurality of copies are desired to be produced in the industrial copier, the original has to be transferred across the scanning position a same number of times as a desired number of copies. One conventional apparatus can provide the plurality of copies by manually reloading the original for each copy by an operator. However, this was troublesome and time consuming. Therefore, a recycle type copier was proposed for making a plurality of copies.

The recycling type copier has a closed loop path for feeding the document. The copier automatically and continuously feeds a document to the scanning point on the closed loop path. The recycling type copier can very effectively produce a plurality of copies of a document, but a problem with this type of copier is that the length of the document must be shorter than the length of the closed loop path. Therefore, a large size document feeder with a long loop path is necessary for copying a large size document. However, a compact size of copier is preferable because of limited office space.

Therefore, a document feeder was developed to overcome the above mentioned disadvantages which employs a reciprocating path in addition to the recycling closed path. The reciprocating path comprises an open path in which the scanner is mounted, and the document to be scanned is transferred past the scanning position a plurality of times by a reciprocating movement. A manual selection lever is mounted in the conventional copier in order to select one of the recycling path and the reciprocating path. When the document is small, the recycling path should be selected. When the document is long, the reciprocating path should be selected. When an operator uses the copier, the operator has to pay careful attention to the size of the document to be copied and the position of the manual selection lever, and if necessary, change the manual lever before copying. It is easy to neglect proper setting of the manual selection level and an improper selection can cause problems. It is also necessary to educate operators how to set the lever. When the operator improperly sets the lever or the operator happens to forget to set the lever, a wrong path is selected. For example, if the recycling path is selected for a document which is longer than the length of the recycling closed path, the document may be damaged. When there is a short document and the reciprocating path is selected, time is wasted due to the reciprocating movement.

SUMMARY OF THE INVENTION

It is, therefore, an object of the present invention to provide a compact type copier which is efficient for any length document.

Another object of the present invention is to provide a copier which always selects the proper path.

A further object of the present invention is to provide a generally improved copier.

According to the present invention, the foregoing and other objects are achieved in part by a copier having a document table for holding an original document, a document path connected to the document table having a recycling path and a reciprocating path, the recycling path having a closed loop path, and the reciprocating path having a open loop path. There is a selector which automatically selects one of the recycling path and the reciprocating path, a stationary scanner mounted within the document path for scanning the original document, and a sensor mounted in the document path between the document table and the stationary scanner for detecting a length of the document. When the length of the document detected by the sensor is not longer than a predetermined length, the recycling path is selected and when the length of the document detected by the sensor is longer than a predetermined length, the reciprocating path is selected.

BRIEF DESCRIPTION OF THE DRAWINGS

FIG. 2 shows the copier of FIG. 1 operating in a reciprocating mode;

DETAILED DESCRIPTION OF THE PREFERRED EMBODIMENTS

Figure 1:
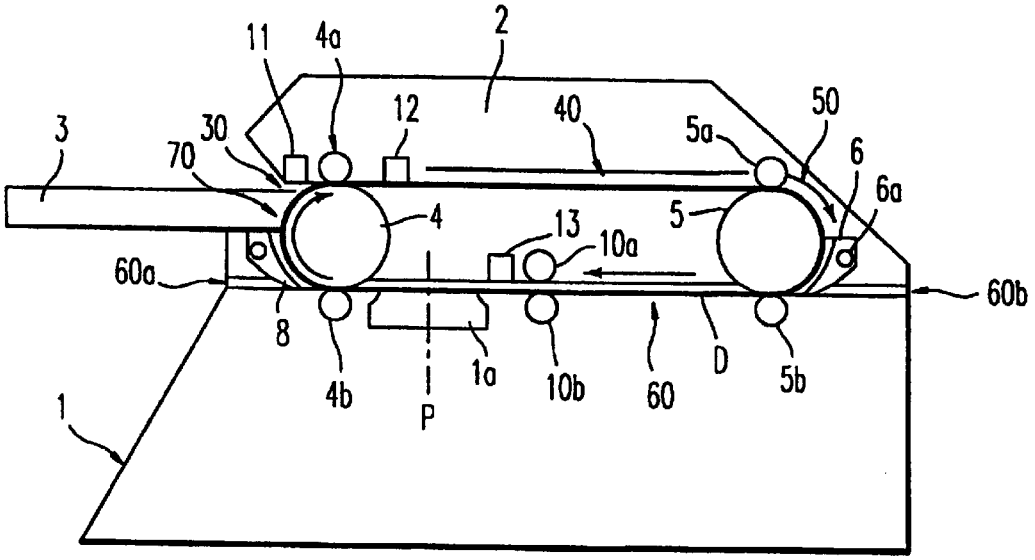
FIG. 1 is a sectional view of a copier according to a first embodiment of the present invention operating in a recycling mode.

Referring now to the drawings, wherein like reference numerals designate identical or corresponding parts throughout the several views and more particularly to FIGS. 1 and 2 thereof, there is illustrated a document feeder unit (transferring means) 2 mounted on a well-known copier body 1. It is to be noted that FIGS. 1 and 2 illustrate the same machine operating in different modes. In FIG. 1, the document feeder is operating in a recycling mode and in FIG. 2, the document feeder is operating in a reciprocating mode. The operations in these modes will be explained in detail below.

The copier body 1 has a contact glass 1a. The document feeder unit 2 mainly comprises a document table 3, front transporting rollers 4, 4a, and 4b, and rear transporting rollers 5, 5a, and 5b. The rollers 4, 4a, 4b, 5, 5a, and 5b are driven by a motor (not shown) and the rotation can be reversed by a clutch (not shown) or any other known reversing mechanism such as reversing the direction of the motor rotation or the use of a transmission, for example. There is a document inserting portion 30 above the document table 3 where an original document to be copied is inserted.

A document transportation path between the roller 4a and the roller 5a comprises an upper straight path 40. A document transportation path between the roller 5a and the roller 5b on the roller 5 comprises a first turning path 50. A document transportation path between the roller 5b and the roller 4b comprises a lower straight path 60. A front end path 60a and a rear end path 60b are continued from the lower straight path 60. The front end path 60a is located at the front of the path 60 and the rear end path 60b is located at the rear of the path 60. A document transportation path between the roller 4a and the roller 4b on the roller 4 comprises a second turning path 70. Feed rollers 10a and 10b are located on the lower straight path 60 between the roller 5b and the roller 4b.

Figure 4:
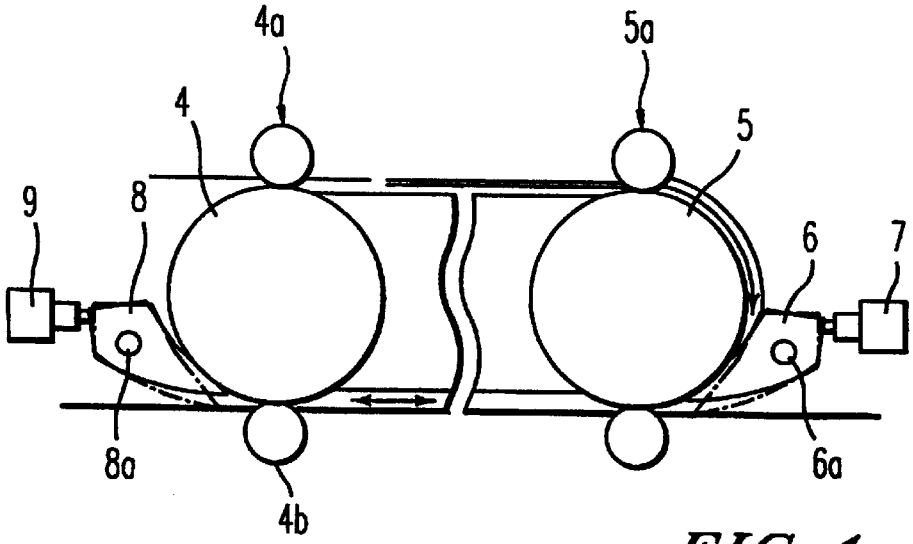
FIG. 4 shows a enlarged view of a document feeding unit.

A rear selector in the form of a pawl 6 is located upstream of the rollers 5 and 5a and pivots at 6a. In FIG. 4 which is an enlargement of portions of FIGS. 1 and 2, it is seen that the pawl 6 is movable between a first position (imaginary lines) and a second position (solid lines) by a solenoid 7. When the solenoid is not actuated, the selector is in the first position. And when the solenoid is actuated, the selector moves to the second position. The solenoids 7 and 9 illustrated in FIG. 4 are controlled by a controller which is explained below with respect to FIG. 7. FIG. 1 and 4 (imaginary lines) show the first position of the pawl 6 which closes down a path between the lower straight path 60 and the rear end path 60b. On the other hand, FIG. 2 shows the second position of the selector 6 which opens a path between the lower straight path 60 and the rear end path 60b.

A front selector in the form of a pawl 8 is downstream of the roller 4b and is movable between a first and a second position by a solenoid 9 which is illustrated FIG. 4. The front selector 8 has a fixed pivot point at 8a in FIG. 4. FIG. 1 and 4 (imaginary lines) show the first position of the selector 8 which closes down a path between the lower straight path 60 and the rear end path 60b. On the other hand, FIG. 2 shows the second position of the selector 8 which opens a path between the lower straight path 60 and the rear end path 60b. As used herein, "downstream" refers to a location along the transportation path in a clockwise direction, while "upstream" refers to a location along the transportation paths in a counter-clockwise direction.

Figure 3A:
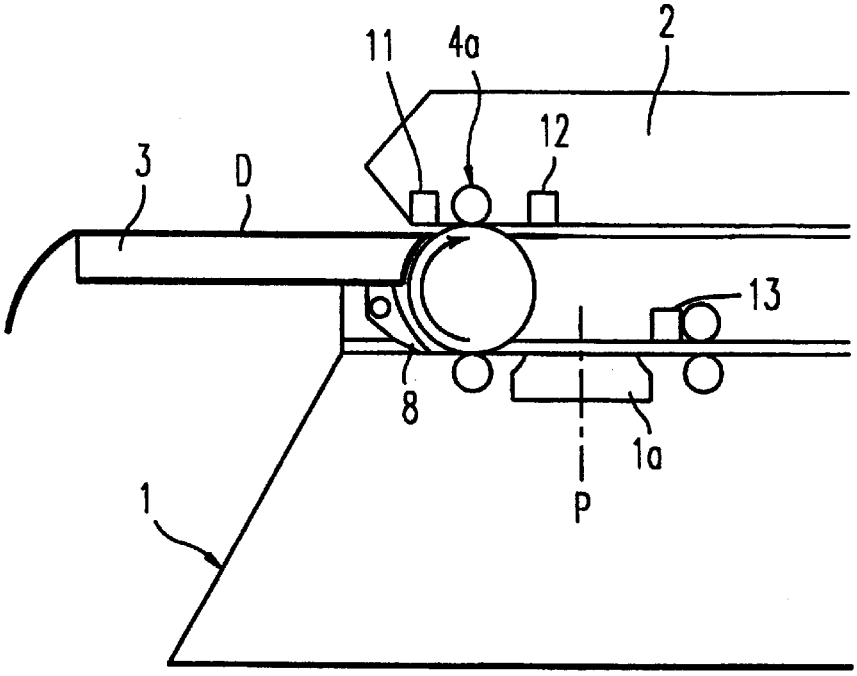
FIG. 3A is a sectional view showing the leading edge of a document in front of sensor 12.
Figure 3B:
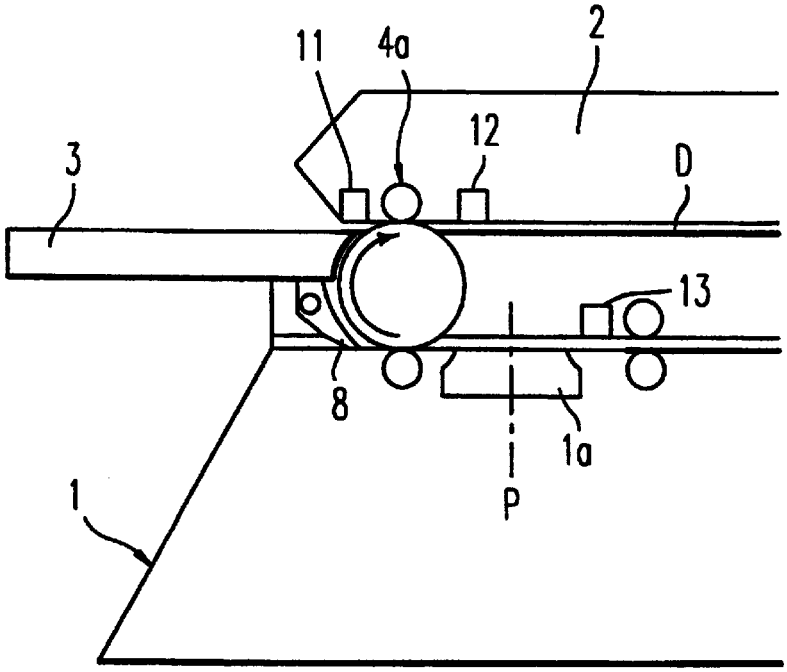
FIG. 3B is a sectional view showing the trailing edge of a document in front of sensor 11.

An explanation of an automatic length detection operation of a document will now be given with respect to FIGS. 3A and 3B. A first sensor 11 is positioned at the document insert portion 30 upstream of the roller 4a. The first sensor 11 detects the existence of the document D in front of the sensor and generates an on signal when a document is in front of the sensor and an off signal when a document is not in front of the sensor. These signals are sent to a controller 100 illustrated in FIG. 7. When a document is initially placed on the document table 3, sensor 11 indicates the presence of the document. A second sensor 12 is positioned downstream of the roller 4a on the upper straight path 40. The second sensor 12 functions in a similar manner as sensor 11 and is used to detect at least a front edge of the document D.

A sensor 13 is located downstream of the contact glass 1a. When the sensor 13 detects the front edge of the document, the detecting signal goes to the controller which determines that the document is about to approach the scanning position P. At this time the controller may check the existence of the copy paper and generate a signal to start scanning.

The starting of the copy cycle and the calculation of the document length will now be explained. When the document D is inserted at the document inserting portion 30, the first sensor 11 detects the tip of the document D and the signal from the first sensor 11 goes to the controller. Then the controller sends the signal to the motors (not shown) to rotate the rollers 4 and 5. The document inserted from the portion 30 is fed into the document feeder unit 2 by the roller 4. The feeding operation automatically begins after the document is in front of sensor 11 for a short predetermined period of time (e.g., 0.1 seconds to 1 second). Alternatively, pressing a copy button on an operation panel will start the document feeding. As another alternative, the detection of the document D and front of the sensor 11 along with the operation of a copy button may be used to begin document feeding.

After the document feeding begins, the second sensor 12 detects the front edge of the document. Later, the first sensor 11 detects the trailing edge of the document, and the length of the document is calculated as follows. A time (t1) is counted from the second sensor's front edge detection to the first sensor's trailing edge detection. The length of the document D is determined using the time data (t1), a distance between the first sensor 11 and the second sensor 12, and the transfer speed of the document. Alternatively, the time during which the document is in front of the second sensor along with the transfer rate can be used to calculate the length of the document using the simple formula distance (length) is equal to the rate of travel multiplied by the time the document is in front of the sensor.

When the length of the document is not longer than a predetermined length, for example 615 mm, a first transfer mode, called a recycle mode, is selected. On the other hand, when the length of the document is longer than the predetermined length, a second transfer mode, called a reciprocating mode, is selected.

When the first or recycle mode is selected, the solenoids 7 and 9 are not actuated, so that the selectors 6 and 8 are in the first position shown in FIG. 1 or imaginary lines of FIG. 4. Therefore, a document transportation path comprises the paths 40, 50, 60 and 70, which is called a recycling path or a closed loop path. When a copy number (n) is selected, the document is recycled on said closed path and is scanned at the scanning point (P) n times. After the n scans are finished, the selector 8 is actuated, so that the document D is discharged out from the front end path 60a.

When the second or reciprocating mode is selected, the solenoids 7 and 9 are actuated so that the selectors 6 and 8 are in the second position shown in FIG. 2 and in solid lines of FIG. 4. Referring to FIG. 2, the document D is inserted at the position 30 and is fed to the paths 40, 50 and 60, the document D is scanned at the point P and is discharged out from the front end path 60a. After the end of the document has passed the scanning point P, the transportation of the document D is stopped. Next, the rollers 4, 5, and 10 are driven reversibly so that the document moves toward the rear position and the end of the document goes out of the rear end path 60b. When the sensor 13 detects the front edge of the document D, the transportation of the document is stopped again, and the document is moved forward. When a copy number n is selected, the document is reciprocated as described so that n copies are made. After the document is scanned n times, the document is discharged. When a copy number n is 1, the document is discharged after a first scanning.

Figure 5:
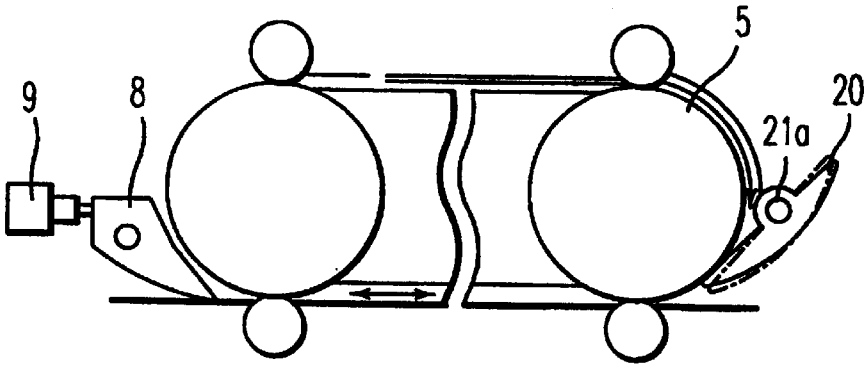
FIG. 5 illustrates a sectional view of a copier according to a second embodiment of the present invention.

A second embodiment of the present invention will be described with reference to FIG. 5. The second embodiment is similar to the first embodiment except that the rear selector or pawl 20 is not mounted to a solenoid but operates using gravity, the motion of the rollers and the document being scanned. A solid line of the selector 20 in FIG. 5 shows a first position of the selector without a passing document and a lower end of the selector 20 is against or close to the surface of the roller 5 by its weight and gravity. Imaginary lines of the selector 20 in FIG. 5 show a second position of the selector at the time when the document is fed clockwise around the roller 5. At this time, the lower end of the selector is pushed by the document so that selector is rotated at a pivot point 21a. In this second embodiment, because an actuator of the selector is not necessary, a simple structure and low cost can be obtained.

Figure 6:
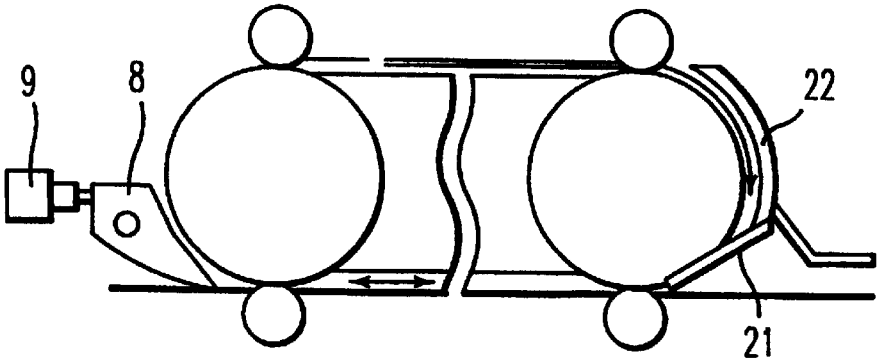
FIG. 6 illustrates a sectional view of a copier according to a third embodiment of the present invention.

A third embodiment of the present invention will be described with reference to FIG. 6. The third embodiment is similar to the first embodiment except that an elastomer 21 is adhered to a guide plate 22 in place of the pawl 6 and solenoid 7 of the first embodiment. When the document is fed, the elastomer 21 bends downward due to the document. After the document has been fed completely, the elastomer 21 changes back to its original shape. FIG. 5 shows a first position of the selector without a document pushing the selector downward.

Figure 7:
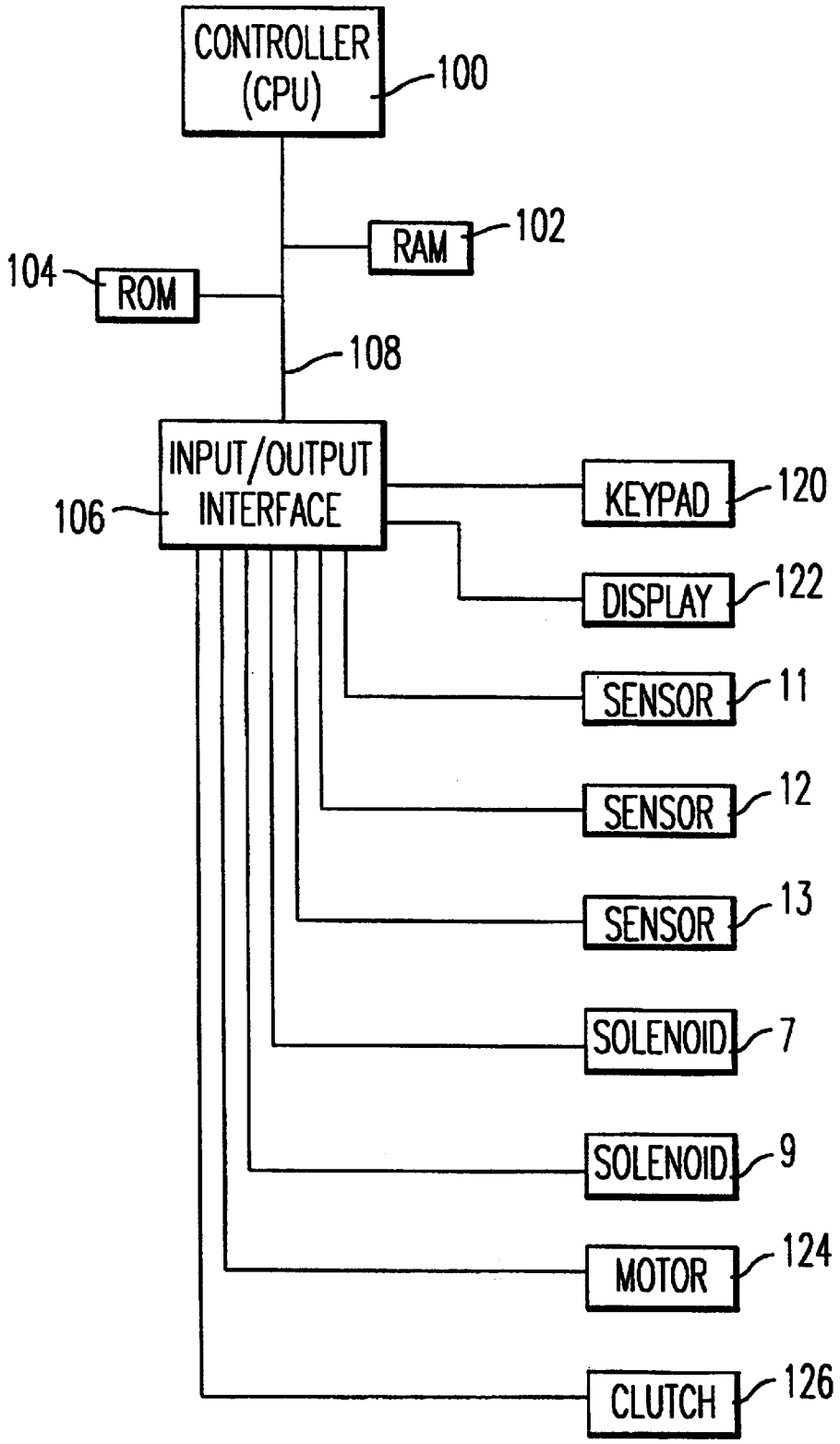
FIG. 7 illustrates electrical components used to control the invention.

FIG. 7 illustrates the electrical components used to control the invention. A controller 100 controls the operation of the copier and automatic document feeder and may be a CPU, or any known conventional microprocessor. A ROM 104 is used to store programs to control the CPU and a RAM 102 is used to store various types of data. An input/output interface 106 allows communication between the input/output devices and the controller 100. A system bus 108 connects the input/output interface 106, the ROM 104, the RAM 102, and the controller 100.

Exemplary input/output devices connected to the input/output interface 106 are as follows. A keypad 120 can be used to set various parameters of the copier and command a starting of the copier operation. A display 122 displays the status of the copier to the user. Sensors 11, 12, and 13 correspond to the sensors illustrated in FIGS. 1–3B. Solenoids 7 and 9 correspond to the solenoids illustrated in FIG. 4 (and also solenoid 9 illustrated in FIGS. 5 and 6). A motor 124 drives the rollers and a clutch 126 controls the reversing operation of the rollers.

Figure 8A:
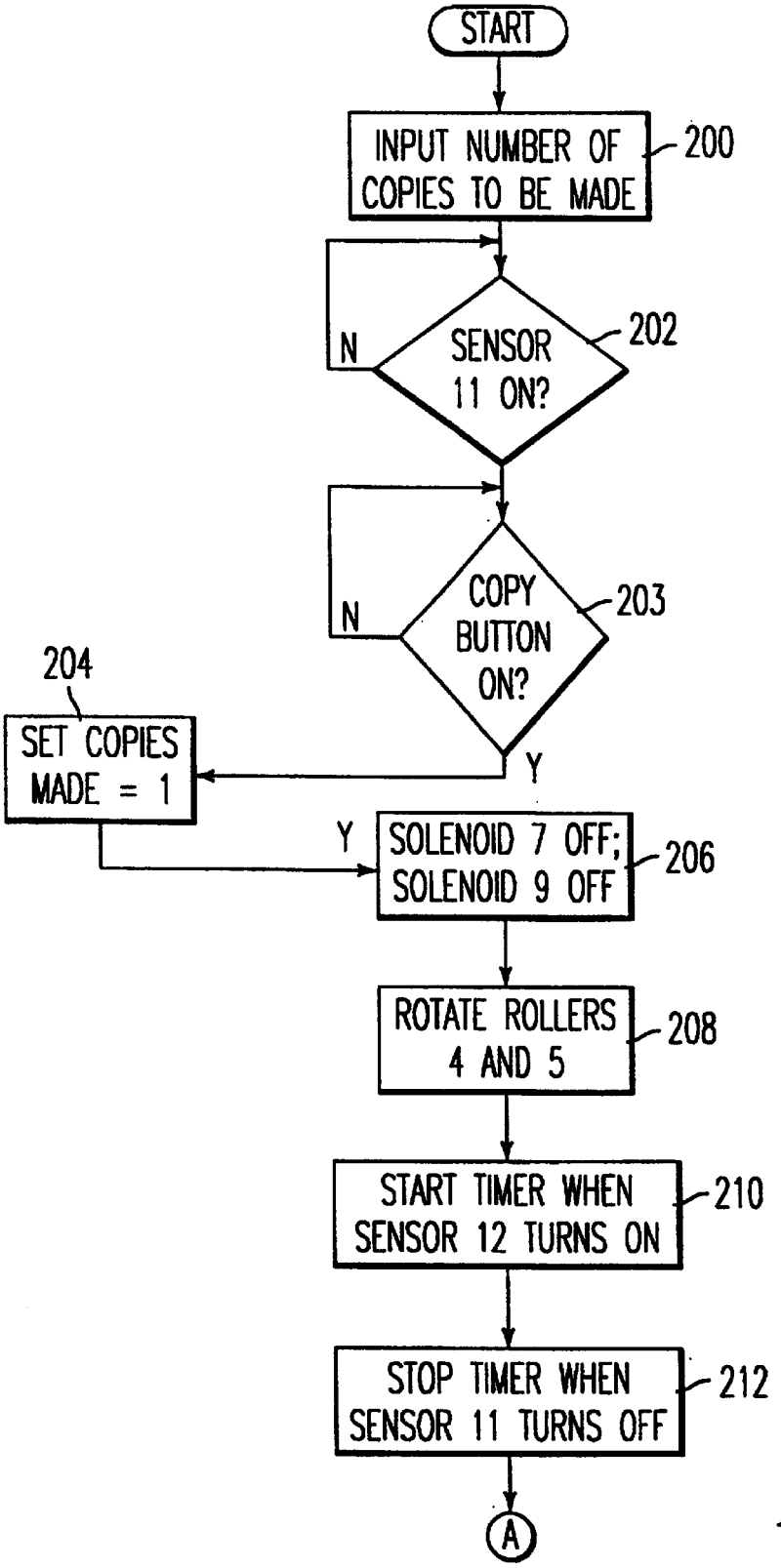
FIG. 8A through 8C illustrate a flowchart of the operation of the invention.
Figure 8B:
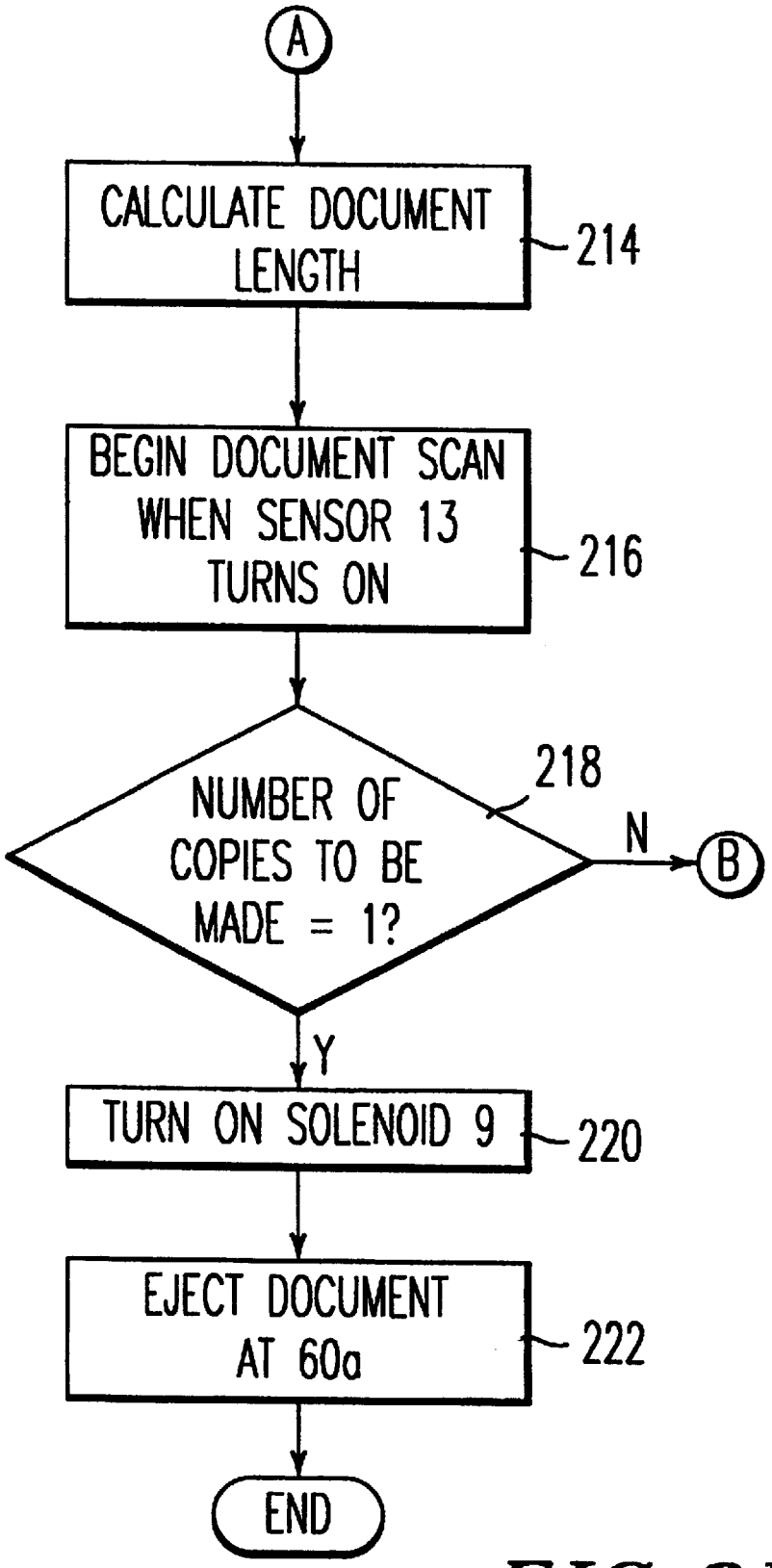
Figure 8C:
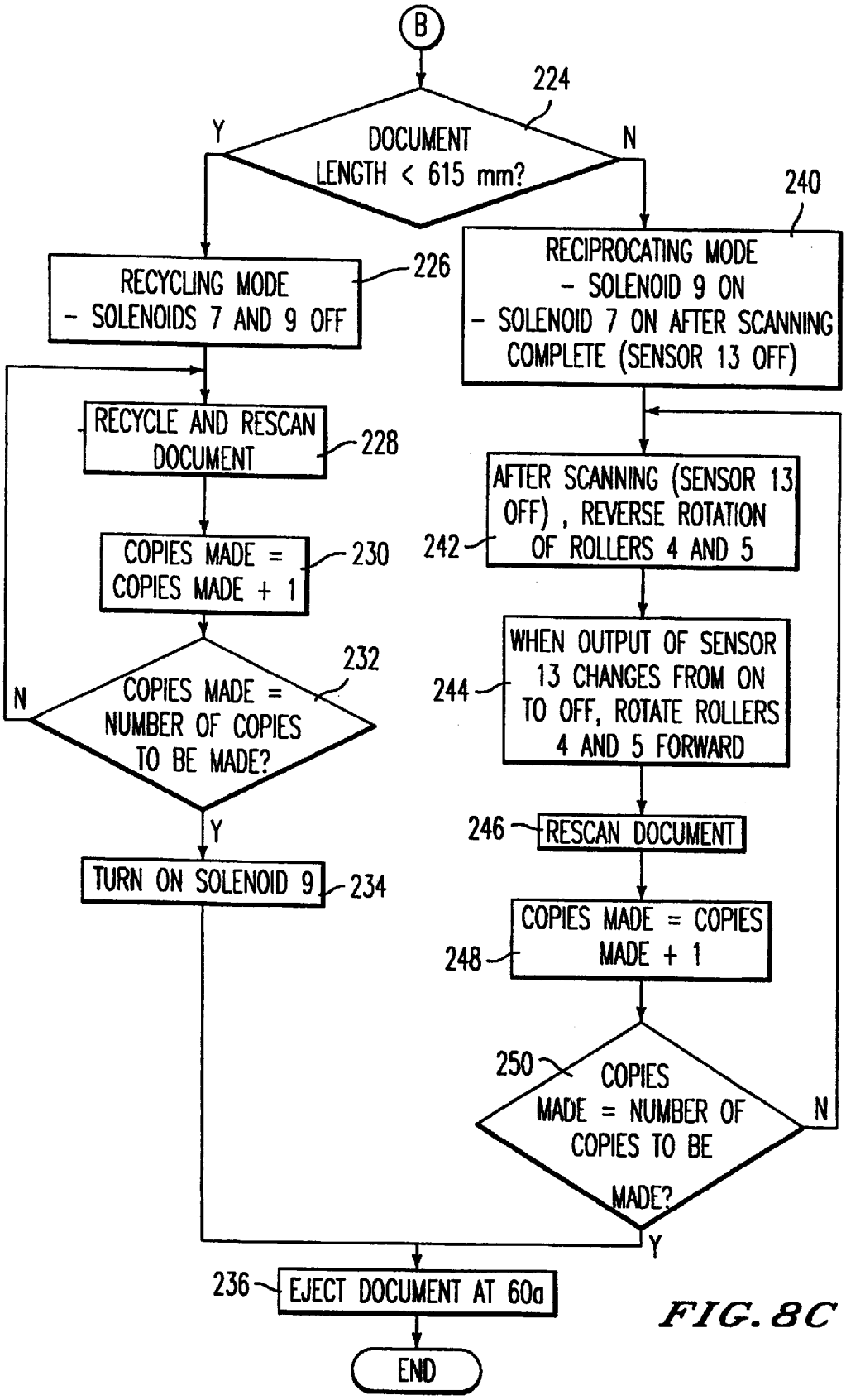

FIGS. 8A–8C illustrate a flowchart showing the operation of the present invention. After starting in FIG. 8, a user will enter the number of copies to be made in step 200. The copy operation begins when the sensor 11 is determined to be on in step 202 and the copy button is determined to be pressed in step 203. It is to be noted that the invention may be constructed without the use of a copy start button and the copying process will begin after sensor 11 is on for a predetermined period of time. Once the copy process begins, step 204 sets the number of copies made equal to 1. Step 206 sets solenoids 7 and 9 off and the pawls 6 and 8 are as illustrated in FIG. 1.

Step 208 begins the rotation of rollers 4 and 5. A timer starts in step 210 when the front edge of the document passes in front of sensor 12. The timer is stopped when the trailing edge of the document passes sensor 11 in step 212. Flow then proceeds to process A illustrated in FIG. 8B.

In FIG. 8B, step 214 calculates the document length as described above. The document continues to be fed in a clockwise direction and when the front edge of the document passes sensor 13, the scanning and copying operation begins in step 216. Step 218 determines if the number of copies to be made has been set to 1. If it has, there is no need to reciprocate or recycle the document and flow proceeds to step 220 which turns on solenoid 9. This causes the pawl 8 to be in the position illustrated in FIG. 2 and allows the document to be ejected at 60a in step 222 and the process is terminated.

If the number of copies to be made is determined to be greater than 1 in step 218, flow proceeds to process B illustrated in FIG. 8C. In FIG. 8C, step 224 determines if the document length is less than a predetermined length. In the present embodiment, this length is set to be 615 mm, but of course this length may be changed depending on the construction of the document feeder. When the length is shorter than 615 mm, the recycling mode is set in step 226 which means that the solenoids 7 and 9 are turned off and the pawls 6 and 8 are as illustrated in FIG. 1. After the document is scanned, step 228 recycles and rescans the document. Step 230 increments the variable storing the number of copies made by 1. Step 232 determines if the copies made is equal to the number of copies desired to be made. If this is not the case, the loop of steps 228, 230, and 232 is performed until all desired copies are made. After all copies are made, solenoid 9 is turned on in step 234 so that the document may be ejected at area 60a which causes the pawl 8 to be as illustrated in FIG. 2. The process of the invention ends after the document is ejected in step 236.

If the document is greater than or equal to the predetermined length, flow proceeds from step 224 to step 240 where the reciprocating mode is set. This mode turns on solenoid 9 such that the pawl 8 is as illustrated in FIG. 2. In the reciprocating mode, the pawl 6 must also be as illustrated in FIG. 2 but the movement of the pawl 6 cannot occur until the document has passed this position. This may be determined by detecting the trailing edge of the document by sensor 13. After the document is scanned which is determined by detecting the trailing edge of the document at sensor 13, the rotation of rollers 4 and 5 are reversed in step 242. The reverse rotation of the rollers is stopped in step 244 when the output of sensor 13 changes from on to off, indicating that the document has backed up past the sensor 13. At this time, the rollers 4 and 5 are rotated forward and step 246 rescans the document. Step 248 increments the number of copies made by 1. Step 250 determines if the number of copies made is equal to the desired number of copies. If it is not, the loop of step 242 through 250 continues until all copies are made. After the desired number of copies are made, the document is ejected by step 236 and the process of the invention ends.

It is to be noted that throughout the present writing, the operation of the invention has been described with respect to the document length. This described length corresponds to a dimension of the document which is parallel to the movement of the document through the document feeder.

Obviously, numerous modifications and variations of the present invention are possible in light of the above teachings. It is therefore to be understood that, within the scope of the appended claims, the invention may be practiced otherwise than as specifically described herein. For example, the invention is not limited to use in an industrial type copier for broad-width originals but this invention may be used in any other type of copier or scanner.

What is claimed as new and desired to be secured by Letters Patent of the United States is:

1. A scanning apparatus, comprising:

a document table for holding an original document;

a document feeder which operates in a recycling mode and a reciprocating mode *in which a conveying path is straight*;

a stationary scanner for scanning the original document;

a sensor mounted in an original document path;

means for detecting a length of the document using information from said sensor; and means for selecting the recycling mode when the detected document length is less than a predetermined length and for selecting the reciprocating mode when the detected length is greater than the predetermined length, wherein said means for selecting includes:
a selector in a form of a pawl; and
a solenoid for actuating said selector.

2. A scanning apparatus, comprising:

a document table for holding an original document;

a document feeder which operates in a recycling mode and a reciprocating mode;

a stationary scanner for scanning the original document;

a sensor mounted in an original document path;

means for detecting a length of the document using information from said sensor; and means for selecting the recycling mode when the detected document length is less than a predetermined length and for selecting the reciprocating mode when the detected length is greater than the predetermined length, wherein said means for selecting includes:
a selector whose position changes due to a pressure of the original document.

3. A scanning apparatus, comprising:

a document table for holding an original document;

a document feeder which operates in a recycling mode and a reciprocating mode;

a stationary scanner for scanning the original document;

a sensor mounted in an original document path;

means for detecting a length of the document using information from said sensor; and means for selecting the recycling mode when the detected document length is less than a predetermined length and for selecting the reciprocating mode when the detected length is greater than the predetermined length, wherein said means for selecting includes:
an elastomer.

4. A scanning apparatus, comprising:

*a* document table for holding an original document;

a document feeder which operates in a recycling mode and a reciprocating mode *in which a conveying path is straight*;

a stationary scanner for scanning the original document;

a sensor mounted in an original document path;

means for detecting a length of the document using information from said sensor;

means for selecting the recycling mode when the detected document length is less than a predetermined length and for selecting the reciprocating mode when the detected length is greater than the predetermined length; and a second sensor mounted in the path of the original document proximate to the scanner used for detecting when changes in a reciprocating movement of the original document are to occur.

5. A method of scanning a page using a document feeder having a reciprocating mode and a recycling mode, comprising the steps of:

inputting a number of copies of the page which are to be made;

determining a length of the page;

moving the page to a scanner using the document feeder by rotating a belt in a predetermined direction;

scanning the page;

ejecting the page by continuing the rotating of the belt in the predetermined direction, regardless of a size of the page, when the number of copies of the page which are to be made is one;

using the recycling mode of the document feeder to scan the page a second time, when the number of copies to be made is greater than one and the length of the page was determined to be less than a predetermined length; and using the reciprocating mode of the document feeder to scan the page a second time, when the number of copies to be made is greater than one and the length of the page was determined to be greater than the predetermined length.

6. A method according to claim 5, wherein:

a region of the document feeder from which the page is ejected is different from a region from which the page enters the document feeder in order to be moved to a scanning position by the moving step.

* * * * *